United States Patent
Grosch

[15] 3,679,135
[45] July 25, 1972

[54] IRRIGATION APPARATUS

[72] Inventor: Gottlieb W. Grosch, Silver Creek, Nebr. 68663

[22] Filed: Jan. 25, 1971

[21] Appl. No.: 109,370

[52] U.S. Cl..............................................239/183, 239/184
[51] Int. Cl............................................................B05b 3/00
[58] Field of Search....................239/183, 184, 185; 137/344

[56] References Cited

UNITED STATES PATENTS

| 3,444,941 | 5/1969 | Purtell | 239/183 X |
| 3,349,794 | 10/1967 | Behlen | 239/183 X |
| 3,463,175 | 8/1969 | Rogers | 239/184 X |
| 3,575,200 | 4/1971 | Imeson | 137/344 |
| 1,079,817 | 11/1913 | Williamson | 239/185 X |

Primary Examiner—M. Henson Wood, Jr.
Assistant Examiner—Edwin D. Grant
Attorney—Zarley, McKee & Thomte

[57] ABSTRACT

An irrigation apparatus comprising an elongated water supply pipe which extends along the length of the area to be irrigated and which is in communication with a source of water under pressure. The supply pipe has a plurality of spaced apart water discharge valves provided thereon along the length thereof which are normally closed but which are adapted to permit the flow of water from the supply pipe therethrough upon being opened. A water actuator means is movably mounted on the supply pipe along the length thereof and has means thereon to successively open and close the discharge valves along the supply pipe. The valve actuator means has at least one sprinkler pipe means extending therefrom which is transversely disposed with respect to the water supply pipe. The sprinkler pipe means has a plurality of sprinkler means along the length thereof which are in fluid communication with the water supply pipe when the actuator means successively opens the discharge valve. The apparatus includes power means for propelling the actuator means along the water supply pipe to successively actuate the water discharge valves so that the sprinkler pipe means will have a constant and continuous supply of water furnished thereto as the actuator means moves along the length of the water supply pipe. The sprinkler pipe means is preferably supported by a plurality of spaced apart self-propelled water towers which have the sprinkling means provided thereon.

7 Claims, 7 Drawing Figures

INVENTOR
GOTTLIEB W. GROSCH
BY
Zarley, McKee & Thomte
ATTORNEYS

IRRIGATION APPARATUS

Conventional self-propelled sprinkling irrigation systems such as disclosed in U.S. Pat. No. 3,001,721 generally comprise a central pivot about which rotates an elongated irrigation pipe which is supported by self-propelled towers. The apparatus disclosed in said patent irrigates large circular areas of the field but cannot irrigate the corners of the field when the field is rectangular or square shaped. Thus, large areas of the field are unproductive when such a system is used.

Therefore, it is a principal object of this invention to provide an improved irrigation apparatus.

A further object of this invention is to provide an irrigation apparatus which is adapted to irrigate rectangular or square shaped fields.

A further object of this invention is to provide an irrigation apparatus which comprises a transverse sprinkler means which is movably mounted on a water supply pipe means extending along the length of the field.

A further object of this invention is to provide an irrigation apparatus which is efficient in operation.

A further object of this invention is to provide an irrigation apparatus which is economical to manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 1:
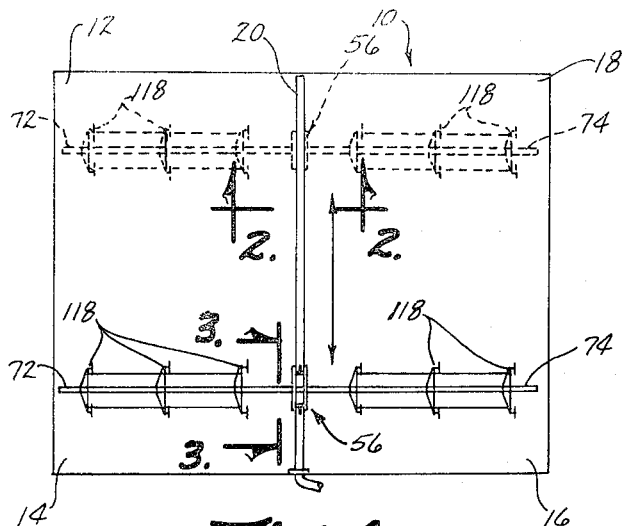
FIG. 1 is a top plan view of a field having the irrigation apparatus of the invention provided thereon.
Figure 2:
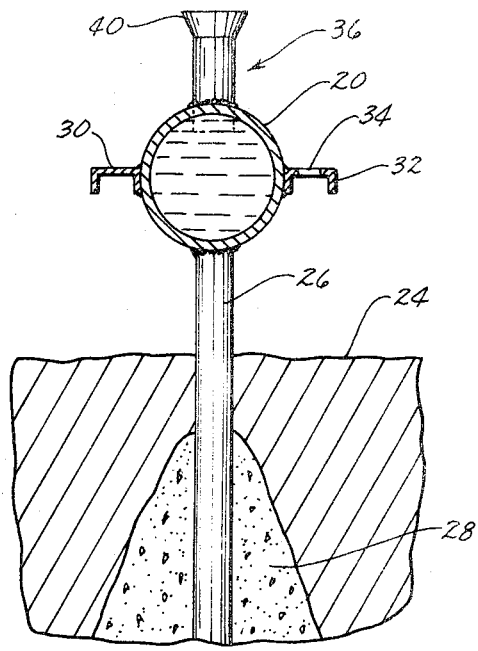
FIG. 2 is an enlarged sectional view as seen along lines 2—2 of FIG. 2.

In FIG. 1, the field to be irrigated is designated by the reference numeral 10 and can be seen to be generally rectangular in shape. If a conventional self-propelled irrigation system were to be used on field 10, the corners 12, 14, 16 and 18 would not be irrigated and would be unproductive.

In the apparatus of this invention, a main water supply pipe 20 is extended through the center of the field. If desired, the pipe 20 could be extended along one end of the field such as end 22. The pipe 20 is preferably supported above the ground 24 by means of a plurality of spaced apart legs 26 secured thereto which extend downwardly into the ground and are anchored by means of concrete 28. Pipe 20 is provided with elongated channels 30 and 32 which are secured to the opposite sides thereof by welding or the like and which extend along the length of the pipe 20. Preferably, at least one of the channels has a plurality of spaced apart openings 34 formed therein along the length thereof. The pipe 20 is in communication with a source of water under pressure.

Figure 6:
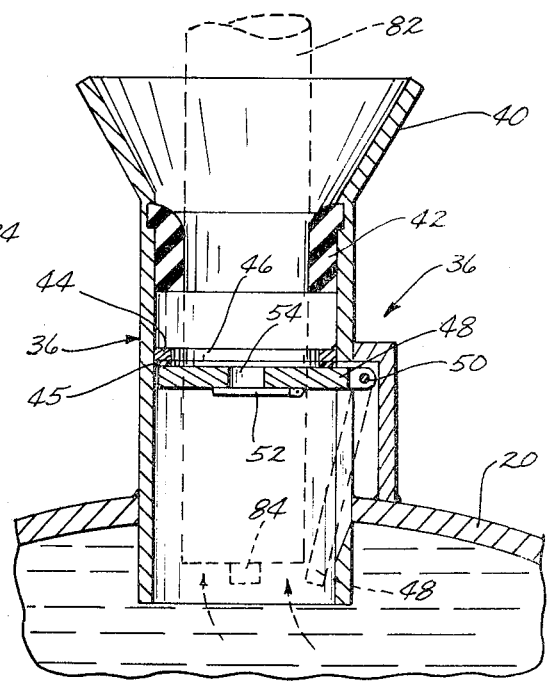
FIG. 6 is an enlarged sectional view seen along lines 6—6 of FIG. 3.

The numeral 36 refers generally to a plurality of spaced apart water discharge valves which are provided along the length of the pipe 20 and which are in fluid communication with the pipe 20. Each of the valves 36 comprise a hollow pipe 38 secured to the pipe 20 in any convenient manner such as seen in FIG. 6 so that the lower end thereof is in communication with the interior of pipe 20. Pipe 38 includes a funnel shaped upper end 40 below which is mounted a resilient seal or gasket 42. A ring shaped valve seat 44 is secured to the interior wall surface of pipe 36 by welding or the like and has a central opening 46 formed therein. Gasket 45 is mounted on the under side of valve seat 44 for sealing purposes.

A valve member 48 is pivotally secured to the pipe 36 below valve seat 44 and is normally closed upon the gasket 45 to prevent water from escaping from the pipe 20. The water pressure within pipe 20 will normally maintain the valve member 48 in its closed position but a spring means may be mounted on the pivot pin 50 to urge the valve member 48 to its closed position if desired. If extremely high water pressure is present, it may be necessary to provide an auxiliary pivotal valve member 52 on the under side of the valve member 48 which normally closes opening 54 in valve member 48.

Figure 3:
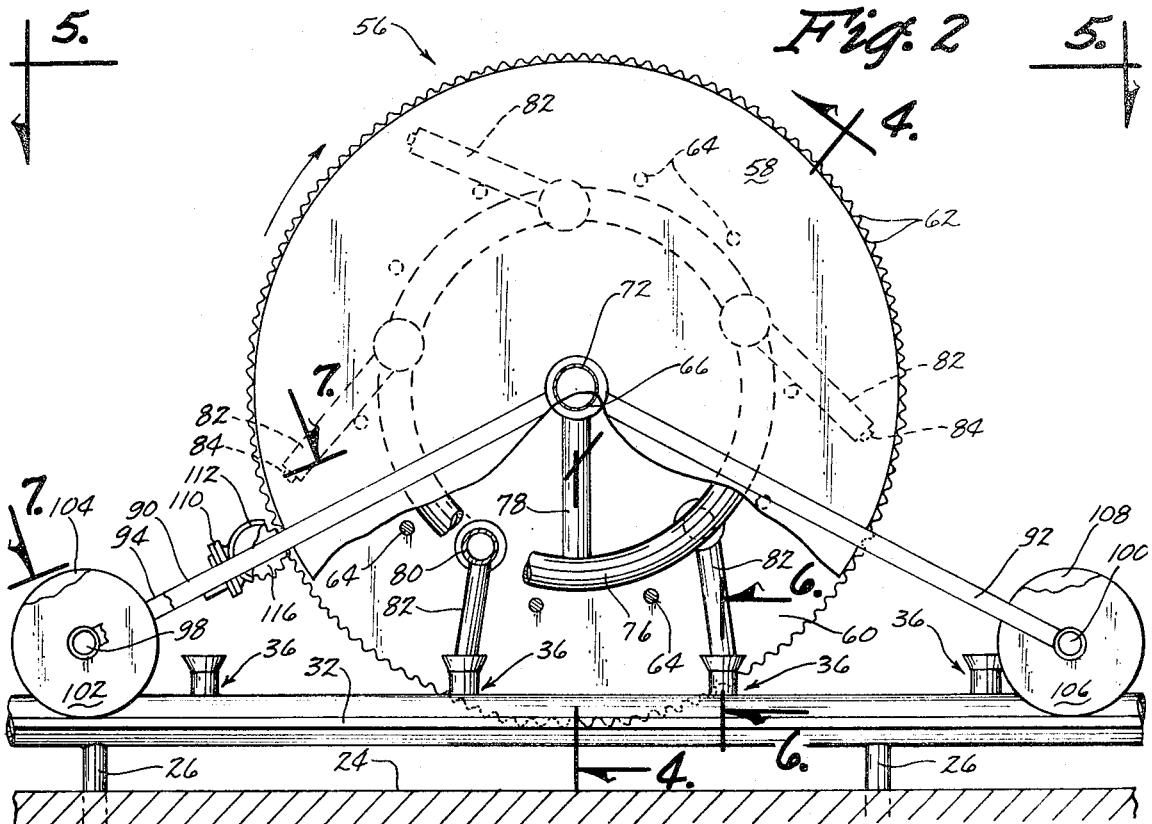
FIG. 3 is an enlarged sectional view as seen along lines 3—3 of FIG. 2 with portions thereof cut away to more fully illustrate the invention.
Figure 4:
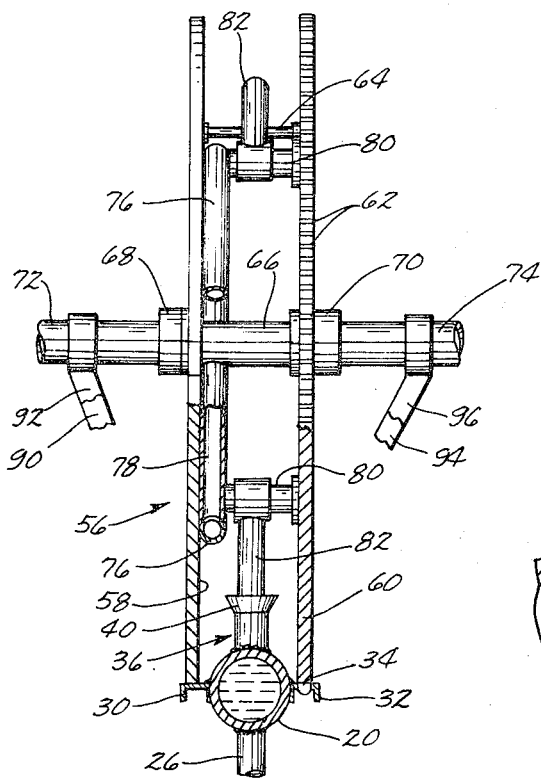
FIG. 4 is a sectional view seen along lines 4—4 of FIG. 3.

The reference numeral 56 designates a valve actuator which is movable along the length of pipe 20 to successively open and close the valves 36 to provide a continuous supply of water to the sprinkling apparatus as the device moves from one end of the pipe 20 to the other end. Actuator 56 includes a pair of spaced apart wheels 58 and 60 which are adapted to move along the channels 30 and 32 respectively. Wheel 60 is provided with teeth 52 at its periphery which register with the openings 34 in channel 32. A plurality of rods 64 are secured to and extend between the wheels 58 and 60 as seen in FIGS. 3 and 4.

Pipe 66 is secured to and extends between the wheels 58 and 60 and is provided with conventional swivel couplings 68 and 70 at its opposite ends adapted to have pipes 72 and 74 rotatably connected thereto. A ring shaped pipe 76 is secured to wheel 58 by any convenient means as illustrated in the drawings. As seen in FIG. 3, pipe 78 is secured to and extends between pipes 76 and 66 to provide fluid communication between pipes 76, 78, 72 and 74. A plurality of spaced apart pipe sections 80 are secured at one end to pipe 76 and are secured at the other end to wheel 60 by any convenient means. Dipper pipes 82 are secured to each of the pipe section 80 and are in fluid communication therewith. The connection between pipe 82 and pipe section 80 is such that pipe 82 is permitted to pivot with respect thereto. The means of connecting the pipe 82 and pipe section 80 is not critical to this invention but the pipe 82 must be permitted a certain amount of movement as will be explained hereinafter. The outer end of the pipes 82 may be provided with an optional valve actuator finger 84 if the optional valve member 52 is utilized.

Figure 5:
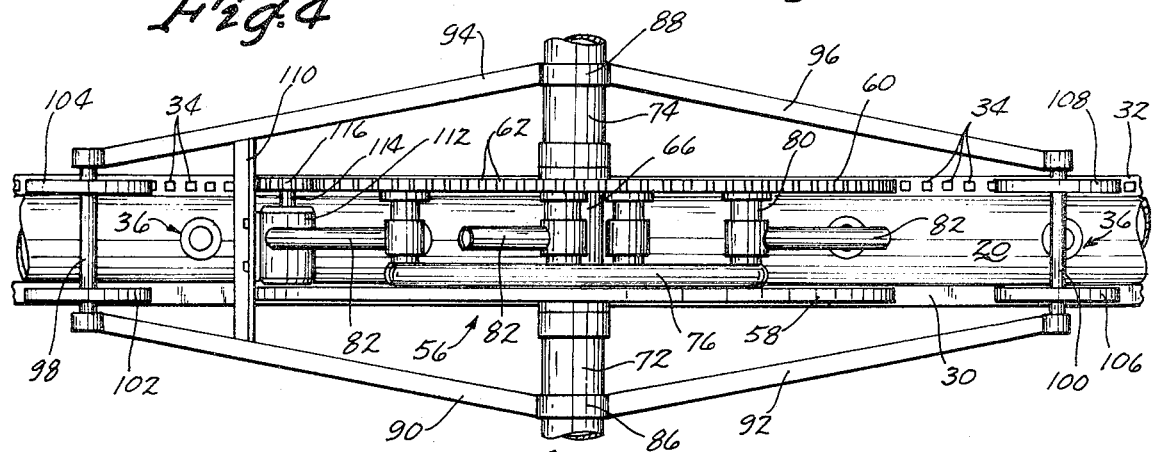
FIG 5 is a fragmentary view of the apparatus seen along lines 5—5 of FIG. 3.
Figure 7:
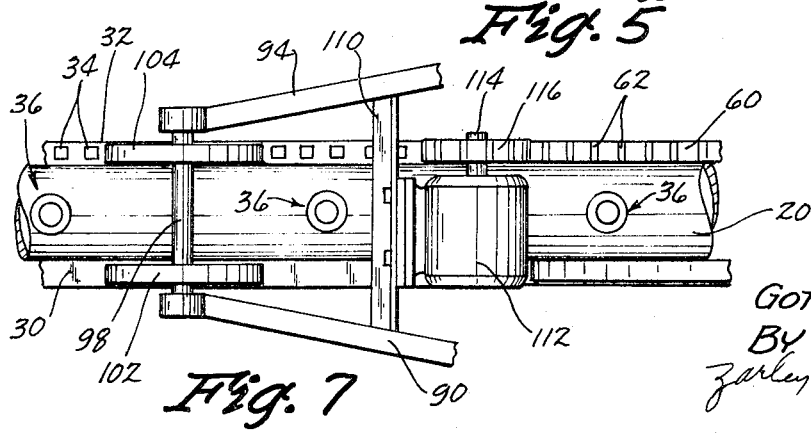
FIG. 7 is an enlarged sectional view as seen along lines 7—7 of FIG. 3.

As seen in FIG. 5, collars 86 and 88 rotatably embrace pipe 72 and 74 outwardly of wheels 58 and 60 respectively. If desired, suitable bearings may be employed within the collars to decrease friction between the collars and the pipe. Braces 90 and 92 are secured to collar 86 and extend therefrom as shown in FIG. 5. Braces 94 and 96 are secured to collar 88 and extend therefrom as also illustrated in FIG. 5. An axle 98 or other suitable shaft is secured to and extends between the ends of braces 90 and 94 with an axle 100 secured to and extending between the ends of braces 92 and 96. Rotatable guide wheels 102 and 104 are mounted on axle 98 for movement on channels 30 and 32 respectively with rotatable guide wheels 106 and 108 being mounted on axle 100 for movement on channels 30 and 32. The braces 90, 92, 94, 96 and guide wheels serve to maintain the apparatus on the pipe 20 in an aligned and stable condition. Cross brace 110 is secured to and extends between braces 90 and 94 (Fig. 5) and supports a motor 112, either electric or hydraulic, thereon which has a power shaft 114 extending therefrom. Shaft 114 has a gear 116 mounted thereon which is in mesh with the teeth 62 on the periphery of wheel 60 to provide a power means for driving the apparatus along the pipe 20.

It should be noted that the pipe 20 could be positioned at one side of the field with only one of the pipes 72 or 74 then being required. Any suitable sprinkler irrigation apparatus may be employed on the pipes 72 and 74 but it is preferred that a plurality of spaced apart, self-propelled sprinkling towers 118 be positioned along the length of the pipes to aid in propelling the pipes 72 and 74 along the length of the field and also to maintain the pipes 72 and 74 in an aligned position to reduce stress on the valve actuator 56. Sprinkling towers such as disclosed in U.S. Pat. No. 3,001,721 would be suitable for use along the length of the pipes 72 and 74. Sprinkling towers such as disclosed in said patent may also make the need for a motor 112 unnecessary on the actuator 56 since the propulsion of the sprinkling towers would tend to pull the actuator 56 along the length of the pipe 20. However, it is preferred that a power means be employed on the actuator 56.

In operation, the valve actuator 56 is positioned on one end of the pipe 20 with the necessary lengths of pipes 72 and 74 being extended outwardly therefrom so as to permit the irrigation of the entire field. Water under pressure is supplied to the pipe 20 and the motor 112 is then actuated which causes the gear 116 to rotate or drive the wheel 60. The rotation of the wheel 60 by the motor 112 causes the teeth 62 of wheel 60 to engage the openings 34 to provide positive traction along the length of the channels 30 and 32 along the length of the pipe 20. The engagement of the wheels 58 and 60 with the channels 30 and 32 on opposite sides of the pipe 20 tend to maintain the actuator 56 in an aligned position with respect to the pipe and such alignment is enhanced by the various braces and guide wheels previously described. As the actuator 56 is rotated, the dipper pipes 82 are lowered into engagement with the water discharge valves 36 and are received therein. The rods 64 aid in maintaining the dipper pipes 82 in the proper position as they are being lowered with respect to the valves 36 with the funnel shaped upper end 40 of the valves 36 also aiding and guiding the pipe 82 into the interior of the valve 36. As the dipper pipe 82 is lowered into the valve 36, the lower end of the pipe 82 engages the pivotal valve member 48 and pivots the same downwardly to the position illustrated by broken lines in 56 to permit the water in pipe 20 to be forced upwardly through the interior of the dipper pipe 82, into pipe section 80, pipe 76, pipe 78, pipe 66 and outwardly through the pipes 72 and 74. The optional valve member 52 may be employed if extremely high water pressure is present with the finger 84 on dipper pipe 82 initially opening the valve member 52 before the valve member 48 is opened. The initial opening of the valve member 52 permits the water to enter the interior of the dipper pipe 82 to tend to equalize the pressure on opposite sides of the valve member 48 so that the downward pressure required to open the same is reduced.

The continued rotation of the actuator 56 by the motor 112 causes the dipper pipe 82 to be withdrawn from the valve 36 with the valve member 48 then closing to prevent the escape of water therefrom. Any number of dipper pipes 82 may be employed on the actuator 56, the only requirement being that at least one dipper pipe 82 is in communication with the water in pipe 20 at a given time to provide a continuous supply of water to the pipes 72 and 74. Obviously, the number of valves 36 and the spacing thereof will depend upon the number and spacing of the dipper pipes 82.

Thus it can be seen that a unique irrigation system has been provided which permits the irrigation of square and rectangular fields. It can also be seen that an irrigation apparatus has been disclosed which permits the continuous supply of water to the irrigation pipes as an actuator is moved along the length of a main water supply pipe. Thus it can be seen that the apparatus accomplishes at least all of its stated objectives.

I claim:

1. An irrigation apparatus, comprising,
an elongated water supply pipe means extending along the area to be irrigated and being in communication with a source of water under pressure,
said supply pipe means having a plurality of spaced apart water discharge valves provided therein along the length thereof, each of said water discharge valves being normally closed but adapted to permit the flow of water therethrough from said supply pipe means upon being opened,
a valve actuator means movably mounted on said supply pipe means adapted to longitudinally move on said supply pipe and to successively open and close said discharge valves along said supply pipe,
said valve actuator means having a second water pipe means extending therefrom which is transversely disposed with respect to said water supply pipe means,
said second water pipe means including sprinkling means along the length thereof, said sprinkling means being in fluid communication with said water supply pipe means as said actuator means successively opens said discharge valves,
and power means propelling said actuator means along said water supply pipe means,
said supply pipe means having a support means extending along the length thereof at opposite sides thereof, said valve actuator means comprising a wheel means rotatably mounted on said support means, said second water pipe means extending transversely from the center of said wheel means, said wheel means including means mounted thereon to successively place the discharge valves in communication with said second water pipe means.

2. The apparatus of claim 1 wherein each of said discharge valves comprises a vertically disposed pipe means extending upwardly from said water supply pipe means, a normally closed valve in said vertically disposed pipe means, said wheel means having a plurality of actuator pipes mounted thereon which are adapted to extend downwardly into said vertically disposed pipe means to open said valve member as said wheel means is moved along said water supply pipe means.

3. The apparatus of claim 1 wherein said wheel means comprises first and second spaced apart wheel members rotatably movably mounted on said support means, said second water pipe means comprising first and second irrigation pipes extending from said first and second wheel members respectively said valve actuator means including a water conduit means extending from said irrigation pipes to an actuator pipe means which is adapted to selectively open said discharge valves to place said irrigation pipes in fluid communication with said water supply pipe means.

4. The apparatus of claim 3 wherein said power means comprises a motor having a drive gear in operative driving engagement with one of said first and second wheel members.

5. The apparatus of claim 1 wherein said valve actuator means includes a first and second guide wheel means which are positioned forwardly and rearwardly thereof, said guide wheel means engaging said support means to maintain said actuator means in alignment with respect to said water supply pipe means.

6. The apparatus of claim 2 wherein said valve member comprises a pivotal primary valve door, said pivotal valve door having an auxiliary pivotal valve door mounted therein which is opened prior to said primary valve door being opened.

7. An irrigation apparatus, comprising,
an elongated water supply pipe means extending along the area to be irrigated and being in communication with a source of water under pressure,
said supply pipe means having a plurality of spaced apart water discharge valves provided therein along the length thereof, each of said water discharge valves being normally closed but adapted to permit the flow of water therethrough from said supply pipe means upon being opened,
a valve actuator means movably mounted on said supply pipe means adapted to longitudinally move on said supply pipe and to successively open and close said discharge valves along said supply pipe,
said valve actuator means having a second water pipe means extending therefrom which is transversely disposed with respect to said water supply pipe means,
said second water pipe means including sprinkling means along the length thereof, said sprinkling means being in fluid communication with said water supply pipe means as said actuator means successively opens said discharge valves,
and power means propelling said actuator means along said water supply pipe means,
said supply pipe means having a support means extending along the length thereof at opposite sides thereof, said valve actuator means comprising a wheel means rotatably mounted on said support means, said second water pipe means extending transversely from said wheel means, said wheel means including means mounted thereon to successively place the discharge valves in communication with said second water pipe means.

* * * * *